INVENTOR.
WALTER L. CLEARWATERS

July 10, 1962  W. L. CLEARWATERS  3,043,967
ELECTROSTRICTIVE TRANSDUCER
Filed Jan. 13, 1960  2 Sheets-Sheet 2
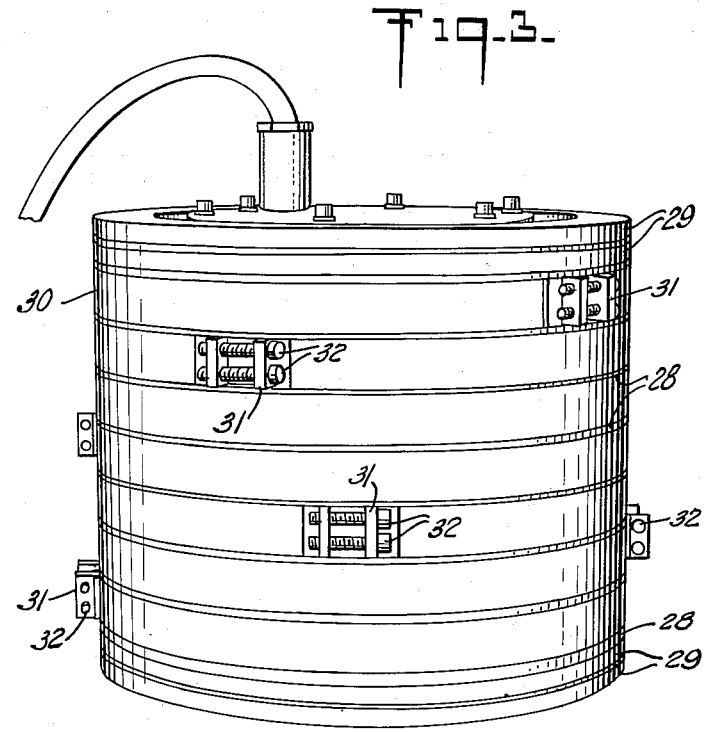
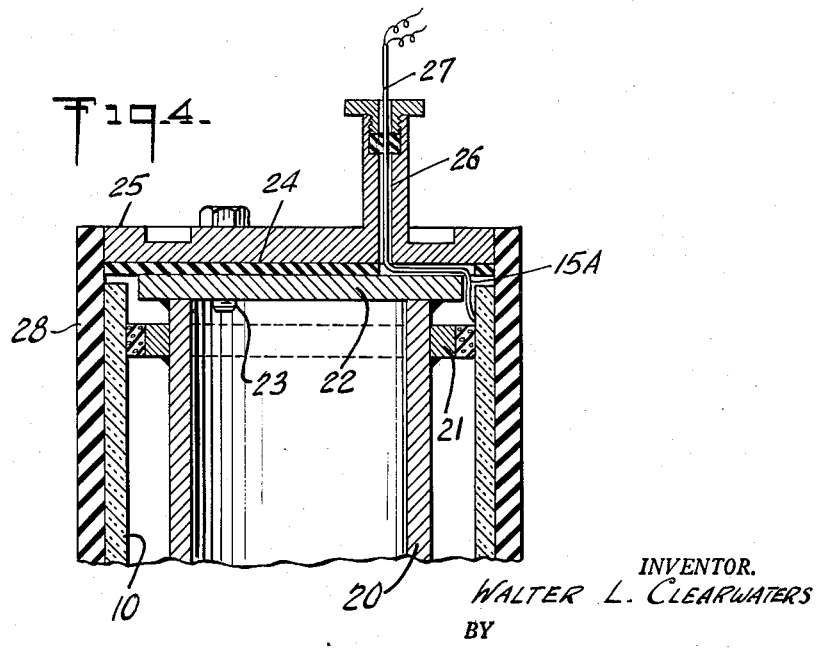
INVENTOR.
WALTER L. CLEARWATERS
BY
ATTORNEYS

United States Patent Office 3,043,967
Patented July 10, 1962

3,043,967
ELECTROSTRICTIVE TRANSDUCER
Walter L. Clearwaters, Old Norwick Road, Quaker Hill, New London, Conn.
Filed Jan. 13, 1960, Ser. No. 2,315
13 Claims. (Cl. 310—8.7)
(Granted under Title 35, U.S. Code (1952), sec. 266)

The invention described herein may be manufactured and used by or for the Government of the United States of America for governmental purposes without the payment of any royalties thereon or therefor.

This invention concerns improvements in electrostrictive transducers of piezoelectric ceramic material.

One of the more common piezoelectric ceramic materials taken as illustrative for purposes of this description comprises a mixture of 96% barium titanate and 4% lead titanate. In the Bell Laboratories Record, vol. XXVII, No. 8, August 1949, pages 285–289, there is provided an explanation of the electrostrictive property of this piezoelectric ceramic and the method of providing remanent D.C. polarization to the ceramic. In Product Engineering of October 1954, pages 161–165, there is provided some detailed description of the steps comprising the more conventional methods of fabricating various piezoelectric ceramic mixtures that include barium titanate, into electrostictive transducers and with information on some of their properties. One method of making an electrostrictive transducer comprising basically barium titanate is to wet mix the material in powder form with binder and lubricant, dry the mixture, pulverize the dried mix and then dry-press the resultant powder into the desired shape at a pressure on the order of 10,000 pounds per square inch. After being press-formed, the ceramic member is dried further and fired for a period of about two hours at a temperature on the order of 1400° C. Electrode film coatings are then applied to two selected opposed surfaces. The electrode film coatings can be sprayed, evaporated, electroplated, painted, or applied by other methods; the least expensive method is to paint a silver paste or silver slurry coating over the entire surface area of the selected faces. The electroded ceramic member then is fired at about 650° C. to fix the electrode film coatings thereon. The next step is to polarize the electroded ceramic member so that it manifests piezoelectric behavior. Polarization is carried out either at room temperature and steep electric field gradient or at somewhat elevated temperature and comparatively moderate field gradient. For example, cold polarization can be carried at room temperature with an electric field gradient of the order of 50,000 volts per inch between electrodes for about 25 minutes. The electric field gradient may be much lower if the electroded ceramic is heated, e.g., to about 130° C. and then gradually cooled while the selected electric field gradient is maintained across the electrode film coatings. The latter method of polarization produces a higher electromechanical coupling factor, and the polarization and the coupling factor obtained by the latter method remain more stable with time than the corresponding properties obtained with the cold polarization method. Insulated electrical leads are joined to the respective electrode film coatings as by soldering. The transducer then is mounted on a support through vibration isolating means and if designed for use in water, it is booted, with castor oil or equivalent included in the boot if needed to eliminate air pockets. This type of electrostrictive transducer is subject to damage if the electrical driving power is increased beyond its power handling capacity. One effect of excessive driving power is a decrease or loss of remanent polarization.

An object of this invention is to greatly increase percentagewise the power handling capacity of a piezoelectric ceramic transducer of the type described above at a very low percentage increase in cost.

A further object is to increase the electromechanical coupling efficiency of the transducer particularly when driven at power levels ranging upward toward the limit of its power handling capacity.

When a piezoelectric ceramic transducer is activated by an electric signal, it vibrates (expands and contracts) in three dimensions or modes. For example, a bar-shape transducer vibrates in length, width, and thickness and a ring-shape or hollow cylindrical transducer vibrates in length, circumference and thickness. The electromechanical coupling factor for the three modes differ substantially, it being by far highest in the mode corresponding to the direction of polarization. In other words, when a voltage is applied across the transducer electrodes between which exists the remanent polarization, the volumetric displacement of one electrode face relative to the other electrode face is substantially greater than the volumetric displacement obtained in either of the other modes. Therefore, it is more advantageous to polarize in the same direction as the desired mode of operation. While this may be readily achieved where the dimension corresponding to the desired mode is an inch or less, it may be impractical where that dimension is several inches or more because the voltage required for polarization across several inches is so high. Also, for a mode such as the circumferential mode of a hollow cylindrical transducer there are no faces across which the polarization can be applied because the cylinder is endless in the circumferential direction. If a transducer is fabricated from a plurality of segments individually polarized and bonded together in seriatum to provide a desired direction of polarization, the power handling capacity of the transducers is substantially lower than that of a comparable one-piece homogeneous transducer because the bonded joints tend to rupture well below the apparent power capacity. Also, the cost of such segmented transducers runs high because of the necessity for close dimensional tolerances on the segments and the degree of care required in bonding the segments together uniformly and free of air bubbles in the bonds, so that the mechanical coupling between segments may be high. Accordingly, another object of this invention is to improve transducers that are fabricated from a plurality of transducer segments bonded together in seriatum, where the transducer is assembled from segments to provide a direction of polarization not otherwise attainable.

There is a resonant frequency band for each of the several possible modes of operation for an electrostrictive transducer, but the transducer generally is designed so that the resonant frequency bands corresponding to the several possible modes are separate and distinct and that the operating frequency range coincides with the resonant frequency in the desired mode of operation. The highest resonance of a transducer is related to the thickness dimension, and the lowest resonance is related to the largest dimension. In the course of design, the transducer configuration, the desired frequency band, and the desired mode of operation of the transducer are selected; the selections stem from considerations such as basic purpose, conditions of use, and power requirements. The desired total power capacity and power per unit area then to a large extent determine the actual dimensions though the desired polar pattern may influence the dimensions. If the transducer must be large, larger then practical to fabricate in one piece, the transducer may be fabricated from smaller transducer segments bonded together in seriatum. However, as pointed out previously, a transducer assembled from a plurality of segments often fails well below its apparent power handling capacity.

An object of this invention is to render more practical large size transducers assembled from segments bonded together.

Another object is to increase the efficiency of such transducers and to reduce the fabrication cost of such transducers.

Other objects and many of the attendant advantages of this invention will be readily appreciated as the same becomes better understood by reference to the following detailed description when considered in connection with the accompanying drawing wherein:

FIG. 3 is a completely assembled underwater transducer fabricated in accordance with the teachings of this invention, and FIGURE 4 is an axial section of FIG. 3 taken along part of the length thereof but not including the bands.

Figure 1:
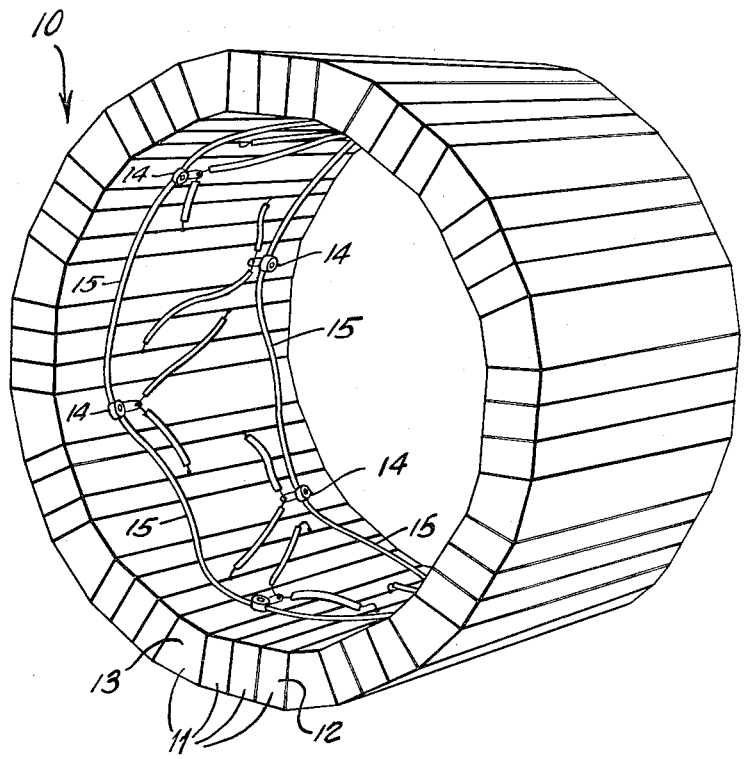
FIG. 1 is an isometric view of a subassembly of the transducer shown in FIG. 3.

There is shown in FIG. 1 a hollow right circular cylindrical electrostrictive transducer 10 for operation in the circumferential mode, formed from a plurality of stavelike segments 11 bonded together in seriatum parallel to the axis of the cylinder. The segments 11 include among them a plurality of substantially identical electrostrictive segments 12 and a plurality of substantially identical metal segments 13; three out of every four consecutive segments are the electrostrictive segments 12 while every fourth segment 13 is of a metal preferably having approximately the same $\rho c$ as the electrostrictive segments, where $\rho$ is the specific acoustic resistance and $c$ is the velocity of sonic energy through the material. Brass is a satisfactory material for metal segments 13. The metal segments 13 provide conveniently located electrical terminals 14 for the connecting leads 15 and have a trapezoidal or keystone shape in cross section, whereby when all the stavelike segments 11 are assembled in seriatum they form a cylinder. Metal segments 13 are less costly than electrostrictive segments 12 and lend themselves more readily to machine shop processes whereby the mounting of electrical terminals 14 thereon and the machining step to provide the keystone shape are relatively inexpensive and devoid of complications. The electrostrictive segments 12 are rectangular in cross section rather than trapezoidal for two reasons, namely, to reduce cost and to obtain uniform polarization between the electrodes; it is less satisfactory to polarize across two non-parallel faces, e.g., opposed keystone faces, than to polarize across parallel faces.

The rectangular electrostrictive segments 12 may be fabricated from materials and by the process described above or from other piezoelectric ceramics or by other methods known in the art. Each segment 12 has electrode coatings on the two opposed radial surfaces which surfaces are normal to the thickness dimension and is polarized between its electrodes, in the thickness dimension, which dimension corresponds to the circumferential mode when transducer 10 is assembled. A mark is made on each segment 12 immediately before or immediately after polarization to indicate the direction of polarization to the assemblar mechanic to enable him to orient the segments properly. The particular segment-to-segment bonding cement for the transducer is not critical; the cement should be rigid when cured or hardened to ensure good mechanical coupling between segments. A preferable bonding cement is one that can be applied in a fairly thin layer free of entrained air bubbles and that forms a rigid joint comparable in stiffness to the segments joined. An epoxy resin cement that forms rigid bonded joints is satisfactory.

Figure 2:
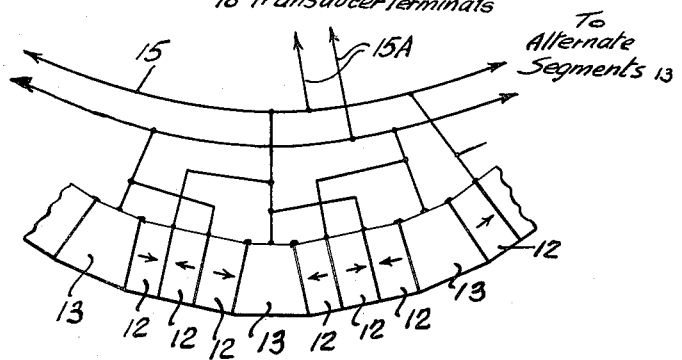
FIG. 2 is an end view of an arcuate portion of the transducer shown in FIG. 1 illustrating electrical connections and polarization.

In FIG. 2, there is shown several of the segments of the transducer of FIG. 1 primarily to illustrate the relationship of polarization among the segments 12 and the electrical connections. Consecutive electrostrictive segments 12 are oriented prior to bonding so that the direction of polarization in each pair of consecutive electrostrictive segments is opposite. The reason for this is to simplify the electrical connections since with this arrangement contiguous electrodes of successive segments 12 may be connected in common. Since the electrode coatings extend to the edge of the surfaces which they coat and may even overlap the adjacent surfaces slightly, one end of a conducting lead is readily connected to a pair of contiguous electrodes along the inner seam edge by means of soldering.

Of the total of twelve electrode coatings on the three electrostrictive segments 12 on each side of a metal segment 13, six electrode coatings are connected to the metal segment 13. On each side of a metal segment 13, the contiguous electrode coating on the first segment 12 and the face-to-face electrode coatings on the second and third segments 12 are electrically connected to segment 13. The two contiguous coatings are connected thereto by solder along the respective inside seams and the other four coatings mentioned above are connected thereto by insulated electrical leads. Each metal segment 13 is also electrically connected to every alternate metal segment 13. Each of the two groups of metal segments 13 electrically connected in common are connected to the two signal leads 15A of the transducer. It is simpler to complete the electrical connections after all the segments are bonded together in seriatum, particularly where the inside diameter of the transducer exceeds six inches. A work bench fixture may be used to support the segments while they are bonded to ensure that the last segment assembled in place closes the cylinder. The relationship between polarization direction and instantaneous signal polarity is the same in all the electrostrictive segments 12 at every instant so that circumferential elongations and circumferential contractions occur in phase in all of the electrostrictive segments.

Metal segments 13 are not essential in the structural combination illustrated in FIG. 1. All of the segments 11 may be electrostrictive segments, and some or all of the electrostrictive segments may be formed so as to have a trapezoidal shape; however, the metal segments 13 are of substantially lower cost than the electrostrictive segments of comparable size and simplify the electrical connections among the electrostrictive segments and simplify the provision of keystone shaped segments. If the $\rho c$ of the metal segments is substantially the same as the $\rho c$ of the electrostrictive segments, the frequency response and transducing properties of the segmented transducer is substantially unaffected by the presence or absence of metal inserts. However, energy conversion takes place in the electrostrictive segments only. More energy can be converted from electrical to mechanical and from mechanical to electrical where there are fewer metal segments and more of the transducer body is of active electrostrictive material. The frequency response and resonance properties depends upon the length, thickness, and circumferential dimensions of the cylinder and the $\rho c$ factor and are approximately the same as the corresponding properties of a one-piece piezoelectric ceramic transducer.

The transducer illustrated in FIGS. 1 and 2 and described above is expensive because each of the segments must be fabricated with close tolerances, and because a great deal of care must be exercised in bonding the segments together to ensure good mechanical coupling and a good mechanical joint. Even with close tolerances and great care in bonding, experience has shown that the bonds tend to fail at input power levels substantially below the apparent or calculated power rating for the selected transducer size, configuration, etc.

In FIG. 4 there is shown a waterproofing arrangement for the electrostrictive transducer 10 of FIG. 1 to adapt it for underwater use. Only one half the assembly is shown, the other half being substantially the same. A metal tube 20, provided with spaced rings 21 affixed thereto along the length thereof and metal end plates 22 affixed thereto, and substantially the same length as the transducer 10 is disposed within the transducer 10. Between the rings 21 and the transducer 10 there is disposed sections of vibration isolating material of unicellular rubber or functional equivalent to support the transducer 10 on the rings 21. The end plates 21 are formed with threaded holes to receive fastening bolts 23. A gasket 24 is disposed against the outer side of each plate 22 and a sealing plate 25 is secured to the end plate 22 by the bolts 23 compressing the sealing gasket therebetween. The end plate 25 is provided with a fluid-tight passage 26 for a signal cable 27 that connects to the signal leads 15A (FIG. 2) not shown in FIG. 4. The connection between signal leads 15A and the cable 27 extends across one face of gasket 24. A cylindrical rubber boot 28 radially undersize, is stretched and assembled over the transducer, care being exercised not to trap air pockets between the boot and the transducer. There is no need for castor oil filling if the boot is tight and there are no trapped air pockets between the outer surface of the transducer 10 and the boot. As illustrated in FIG. 3, the complete assembly is rendered water tight by means of metal straps 29 tightened sufficiently to compress the ends of the rubber boot firmly against the peripheral edges of sealing plates 25. A plurality of elastic metal binding means in the form of straps 30 are assembled under tension on the boot 28 to apply radial compression to the transducer 10. Each of the straps 30 may be of stainless steel about 0.010 inch thick. A short piece of stainless steel angle bar 31 is welded to each end of each strap for receiving fastening bolts 34. At assembly, the bolts 32 are tightened with a torque wrench to obtain substantially uniform tensile stress in all the straps 30. With a moderate amount of tension in the straps sufficient to cause the straps to recess somewhat into the rubber boot, apparent rated power then can be applied to the transducer without rupturing any of the intersegment joints. This result is obtained even if the segments are fabricated with fairly liberal tolerances and with only moderate care exercised in bonding the segments together. The use of straps permits elimination of the bonding step entirely but there is some loss in mechanical coupling due to localized spaces between segments. The spaces occur where the mating surfaces are not perfectly planar. The straps not only raise the power handling capacity to the apparent or calculated power rating but substantially above that rating. The efficiency of the strapped transducer is increased especially at power levels approaching the upper limit of its capacity.

To arrive at a level of tensile stress in the straps that will produce optimum results under selected conditions, it is necessary to conduct tests on a specimen transducer. The tensile stress for optimum results will depend in part on factors such as physical measurements of the transducer, the ambient pressure, and the power supplied to the transducer, the width of the straps, the number of straps and the material of which the straps are formed.

The straps need not necessarily be of stainless steel and the tensioning means need not be bolts 31 but may be selected from among a variety of other mechanical expedients. The straps may be narrower, approaching wire size; however, not only will more tension members be required if wire-like binding means are used, but they will cut through the rubber in a short time where the transducer operates at high power. Alternatively, the straps may be wider but it is more difficult to uniformly stress a wide strap in tension. The spacing between straps should be substantially less than one-quarter wavelength to preclude significant bending action in the transducer between straps. If a material other than stainless steel is selected, it should have a high modulus of elasticity, it should be elastic under the conditions of use, it should be substantially free of creep under the selected conditions of use, and its physical properties should be fairly stable in the range of temperatures encountered in use. The modulus of elasticity of stainless steel may be taken as a guide for a desirable level of modulus of elasticity. If the modulus of elasticity is too low, the straps are not effective; plastic rubber, for example, is unsatisfactory. If the modulus of elasticity is too high, the transducer will not respond to signals. The mechanical attenuating effect of the strap is negligible provided the strap is thin. Corrosion resistance is necessary if the straps are wetted by sea water or other corrosive medium. Also, when the strap is very thin compared to a wavelength, even a major difference between the $pc$ of the strap and the $pc$ of the transducer has negligible effect.

Another example of the utility of this invention is its application to a one-piece homogeneous hollow cylindrical transducer having an electrode coating on its inner surface and its outer surface respectively polarized across the thickness dimension, and banded as for example in FIG. 3. The power handling capability and the efficiency of the one-piece homogeneous transducer is increased thereby. Where a transducer is driven to cavitation as in commercial ultrasonic cleaning processes or in other high power applications, this invention enables reduction in transducer size and cost.

This invention has equal utility in other forms of transducers. For example, a cube-shaped transducer provided with electrode coatings on a pair of opposed faces and polarized therebetween may be strapped to apply compressive stress between the electroded faces and thereby obtain the benefits of increased power handling capability and efficiency therein. Also, an elongated rectangular bar assembled from a plurality of stacked cubes as above, each polarized in a direction corresponding to the length dimension of the rod may be strapped longitudinally to apply compressive stress in the direction of polarization, i.e., longitudinally of the bar to prevent rupture at the bond joints between cubes, to increase the power capacity, and to increase the efficiency. In each instance, care is taken to insulate the straps from the transducer electrodes so that the transducer electrodes are not short circuited.

In FIG. 3, the straps are disposed over the boot. Alternatively, the straps may be disposed on the transducer 10 directly and the boot disposed over the strapped transducer. An advantage of this arrangement is that the boot lasts longer. Where the straps tightly grip the boot they tend to cut into the boot during transducer operation whereby the boot is likely to fail long before it otherwise would where the straps grip the transducer 10 per se. However, if the transducer 10 is strapped directly, care must be exercised to electrically insulate the straps from the transducer electrodes; also, castor oil filling is needed if the boot is disposed over the strapped transducer because the strapped outer surface of the transducer 10 is uneven whereby there would be air pockets between themselves and the boot. Also, where the boot is disposed over the straps, tension adjustments in the straps are a difficult task.

In this invention, elastic straps, bands, or wires, having high modulus of elasticity are used to bind transducers to apply compressive stress in the direction corresponding to mode of operation. The binding means are as thin as practical to minimize attenuation. The space between successive binding means should be substantially less than one-quarter wavelength to preclude bending action in the transducer between successive binding means.

Obviously many modifications and variations of the present invention are possible in the light of the above teachings. It is therefore to be understood that within the scope of the appended claims the invention may be practiced otherwise than as specifically described.

I claim:
1. In an elestrostrictive transducer having a body of piezoelectric ceramic material, a pair of electrodes on a pair of opposed surfaces of the ceramic material and polarized in a direction extending between the electrode bearing surfaces, the improvement which comprises comparatively thin elastic binding means having a modulus of elasticity on the order of that of steel girding said transducer under tension for continuously applying compressive force to said transducer in the direction corresponding to the direction of polarization, whereby when said transducer expands and contracts in said direction of polarization, said binding means is stretched by said transducer during said expansion thereof and when said transducer contracts in said direction, said binding means follows said contraction whereby the percentage variation in load on the transducer during each expansion and contraction is reduced and the direction of the internal stress is not reversed, the power handling capability of said transducer in said direction is increased and its efficiency is increased.

2. In an electrostrictive transducer as defined in claim 1 wherein said transducer is formed of a plurality of segments bonded together in seriatum electrode bearing surface to electrode bearing surface.

3. An electrostrictive transducer as defined in claim 2 wherein said transducer is hollow and in the shape of a right circular cylinder and comprising stave-like segments, and said binding means extend around the outer circumference thereof.

4. An electroacoustic transducer comprising in seriatum a plurality of segments at least one of which is electrostrictive for expansion and contraction in the direction between the adjacent segments, comparatively thin elastic binding means having a modulus of elasticity on the order of steel disposed around and girding said series of segments and under tension to apply continuous compressive force to said series of segments in the seriatum direction.

5. An electroacoustic transducer as defined in claim 4 wherein all of said segments are electrostrictive.

6. An electroacoustic transducer as defined in claim 4 wherein said segments form a hollow cylindrical transducer and said binding means is circumferential.

7. An electroacoustic transducer as defined in claim 6 wherein each of said electrostrictive segments includes polarized ceramic and the direction of polarization extends between the segments on either side thereof and also includes electrical means for applying signal energy thereacross in the direction corresponding to the direction of polarization.

8. A hollow cylindrical electrostrictive transducer comprising a plurality of circumferentially abutting stave-like segments, all of said segments being characterized by approximately equal specific acoustic resistance and approximately equal velocity of sonic energy therethrough and at least some of said stave-like segments being of polarized electrostrictive ceramic material where the direction of polarization is in the circumferential direction around the cylinder and each of said electrostrictive segments having electrode films coating their surfaces that abut adjacent segments, means electrically connecting the electrode films for in-phase circumferential expansion and contraction of said electrostrictive segments in response to an electrical signal applied to said connecting means, electrical insulating means on the outer peripheral surface of said transducer, and elastic binding means girding said electrical insulating means under tension whereby when said transducer expands circumferentially, said binding means is stretched by said transducer and when said transducer contracts circumferentially, said elastic binding follows said contraction while continuously applying compressive force to said transducer thereby increasing the efficiency and the power handling capability of said transducer.

9. A transducer as defined in claim 8, wherein said binding means is adjustable and extends over a major portion of the circumferential area of the transducer and the circumferential stress in said binding means is substantially uniform.

10. A transducer as defined in claim 8, wherein said elastic binding means has a modulus of elasticity on the order of that of steel.

11. A transducer as defined in claim 8, wherein the abutting surfaces of said stave-like segments are cemented together and wherein said transducer minus said elastic binding means fails mechanically at a power level substantially below its apparent power rating based on no joints and wherein said elastic binding means is adjustable to raise the power handling capacity higher than the apparent power rating.

12. In an electrostrictive power transducer including a body of piezoelectric ceramic material and a pair of electrodes on a pair of opposed surfaces of the piezoelectric material and wherein the piezoelectric material is polarized in a direction extending between the electrode bearing surfaces the improvement which comprises elastic binding means whose thickness is small compared to the thickness of the body of piezoelectric material and having a modulus of elasticity on the order of that of steel girding said transducer assembly and under sufficient tension for continuously applying compressive force to said transducer in the direction to urge each electrode bearing surface toward the other electrode bearing surface, whereby when said piezoelectric body expands and contracts in the direction of polarization said binding means is stretched and contracts respectively, the percentage variation in load on the transducer during each expansion and contraction is reduced by the compression, the direction of internal stress in the transducer is not reversed during expansion and contraction, and the power handling capability and efficiency of said transducer in the mode corresponding to the direction of polarization is increased.

13. An electrostrictive power transducer including a plurality of bodies of piezoelectric materials and a pair of electrodes on a pair of opposed surfaces of each of said piezoelectric bodies and wherein each body of piezoelectric material is polarized in a direction extending between the electrode bearing surfaces, said bodies of piezoelectric materials being in seriatum, electrode bearing surface to electrode bearing surface, and an elastic binding means girding the combined bodies of piezoelectric material for continuously applying compressive force thereto in the direction to urge toward said bodies toward one another and to urge toward one another the electrode bearing surfaces of each of said bodies of piezoelectric material and to prevent reversal of internal stress in the transducer in the polarization direction during expansion and contraction.

References Cited in the file of this patent
UNITED STATES PATENTS

| | | |
|---|---|---|
| 2,420,864 | Chilowsky | May 20, 1947 |
| 2,795,709 | Camp | June 11, 1957 |
| 2,838,696 | Thurston | June 10, 1958 |
| 2,928,032 | Daniel et al. | Mar. 8, 1960 |
| 2,947,889 | Rich | Aug. 2, 1960 |